US011999166B2

(12) United States Patent
Kailey et al.

(10) Patent No.: US 11,999,166 B2
(45) Date of Patent: Jun. 4, 2024

(54) ADAPTIVE INK FLUSHING OF OVERLAP NOZZLES OF A PRINTER

(71) Applicants: Walter F. Kailey, Frederick, CO (US); Scott R. Johnson, Erie, CO (US)

(72) Inventors: Walter F. Kailey, Frederick, CO (US); Scott R. Johnson, Erie, CO (US)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 17/821,229

(22) Filed: Aug. 22, 2022

(65) Prior Publication Data

US 2024/0059066 A1 Feb. 22, 2024

(51) Int. Cl.
*B41J 2/165* (2006.01)
*B41J 2/21* (2006.01)

(52) U.S. Cl.
CPC ............... *B41J 2/1652* (2013.01); *B41J 2/21* (2013.01)

(58) Field of Classification Search
CPC .................................. B41J 2/1652; B41J 2/21
See application file for complete search history.

(56) References Cited

U.S. PATENT DOCUMENTS 5,903,288 A 5/1999 Yamaguchi
7,699,426 B2 4/2010 Matsumoto et al.
7,722,152 B2 5/2010 Miyamoto et al.
8,287,087 B2 10/2012 Sano
9,352,570 B2 5/2016 Yamazaki et al.
9,889,668 B2 2/2018 Kifuku
10,682,857 B2 6/2020 Ferreri et al.
10,926,542 B2 2/2021 Ferreri et al.
11,072,178 B1 7/2021 Kailey et al.
2020/0230958 A1 * 7/2020 Ferreri ................ B41J 2/04536

FOREIGN PATENT DOCUMENTS

JP 2010240962 A 10/2010
JP 2010240963 A 10/2010
JP 2013000892 A 1/2013
JP 2013072145 A 4/2013

OTHER PUBLICATIONS

Chandu et al; Direct Binary Search (DBS) algorithm with contraints; SPIE-IS&T vol. 8652 86520K-1; 2013.

* cited by examiner

*Primary Examiner* — Lisa Solomon
(74) *Attorney, Agent, or Firm* — Duft & Bornsen, PC

(57) ABSTRACT

Systems and methods are provided for enhanced flushing of printing systems. One embodiment is a printing system that includes an ink flushing controller. The ink flushing controller is able to identify an overlap region wherein nozzles at adjacent printheads of a marking engine overlap along a widthwise direction, to detect primary nozzles that print image data within the overlap region, and to detect overlap nozzles that do not have firing instructions to eject ink within the overlap region. The ink flushing controller is further able to analyze nozzle firing data for each overlap nozzle to determine inactive firing spans for each overlap nozzle, and in response to determining that an inactive firing span for an overlap nozzle exceeds a threshold, to generate a firing instruction directing the overlap nozzle to eject ink.

20 Claims, 7 Drawing Sheets

ADAPTIVE INK FLUSHING OF OVERLAP NOZZLES OF A PRINTER

FIELD OF THE INVENTION

The invention relates to the field of printing, and in particular, to flushing nozzles of printheads.

BACKGROUND

Entities with substantial printing demands often use a production printer that prints on a web of print media at high-speed. For example, a production printer may print at a rate of one hundred pages per minute or more. A production printer typically includes a print controller that controls the overall operation of the printing system, and a print engine that physically marks the web. The print engine has an array of printheads and each individual printhead includes multiple tiny nozzles that are operable to discharge ink as controlled by the printhead controller.

To ensure that ink does not dry in the nozzle (which can clog the nozzle and decrease print quality), flush marks are periodically printed by the nozzles. The flush marks may be printed onto non-used portions of the web. Alternatively, nozzle flushing may be dispersed within portions of the web marked with print data.

SUMMARY

Embodiments described herein provide systems and methods that adaptively flush ink for a printer, such as a production printer or a cut-sheet printer. In particular, print data is analyzed to determine periods of inactivity for individual nozzles, and flushing is adaptively controlled based on these periods of inactivity. As a part of this process, overlap nozzles of print heads intelligently flush ink after a predetermined period of inactivity, and may further mask the presence of flushing by ejecting ink onto ink applied by a primary nozzle. Adaptive flushing advantageously minimizes ink waste when flushing overlap nozzles, and also makes flushed ink on the web less apparent to the human eye, which improves print quality.

One embodiment is a printing system that includes an ink flushing controller. The ink flushing controller is able to identify an overlap region wherein nozzles at adjacent printheads of a marking engine overlap along a widthwise direction, to detect primary nozzles that print image data within the overlap region, and to detect overlap nozzles that do not have firing instructions to eject ink within the overlap region. The ink flushing controller is further able to analyze nozzle firing data for each overlap nozzle to determine inactive firing spans for each overlap nozzle, and in response to determining that an inactive firing span for an overlap nozzle exceeds a threshold, to generate a firing instruction directing the overlap nozzle to eject ink.

A further embodiment is a non-transitory computer readable medium embodying programmed instructions which, when executed by a processor, are operable for performing a method. The method includes identifying an overlap region wherein nozzles at adjacent printheads of a marking engine overlap along a widthwise direction, detecting primary nozzles that print image data within the overlap region, detecting overlap nozzles that do not have firing instructions to eject ink within the overlap region, analyzing nozzle firing data for each overlap nozzle to determine inactive firing spans for each overlap nozzle, and in response to determining that an inactive firing span for an overlap nozzle exceeds a threshold, generating a firing instruction directing the overlap nozzle to eject ink.

A further embodiment is a method that includes identifying an overlap region wherein nozzles at adjacent printheads of a marking engine overlap along a widthwise direction, detecting primary nozzles that print image data within the overlap region, detecting overlap nozzles that do not have firing instructions to eject ink within the overlap region, analyzing nozzle firing data for each overlap nozzle to determine inactive firing spans for each overlap nozzle, and in response to determining that an inactive firing span for an overlap nozzle exceeds a threshold, generating a firing instruction directing the overlap nozzle to eject ink.

Other example embodiments (e.g., methods and computer-readable media relating to the foregoing embodiments) may be described below.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific example embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
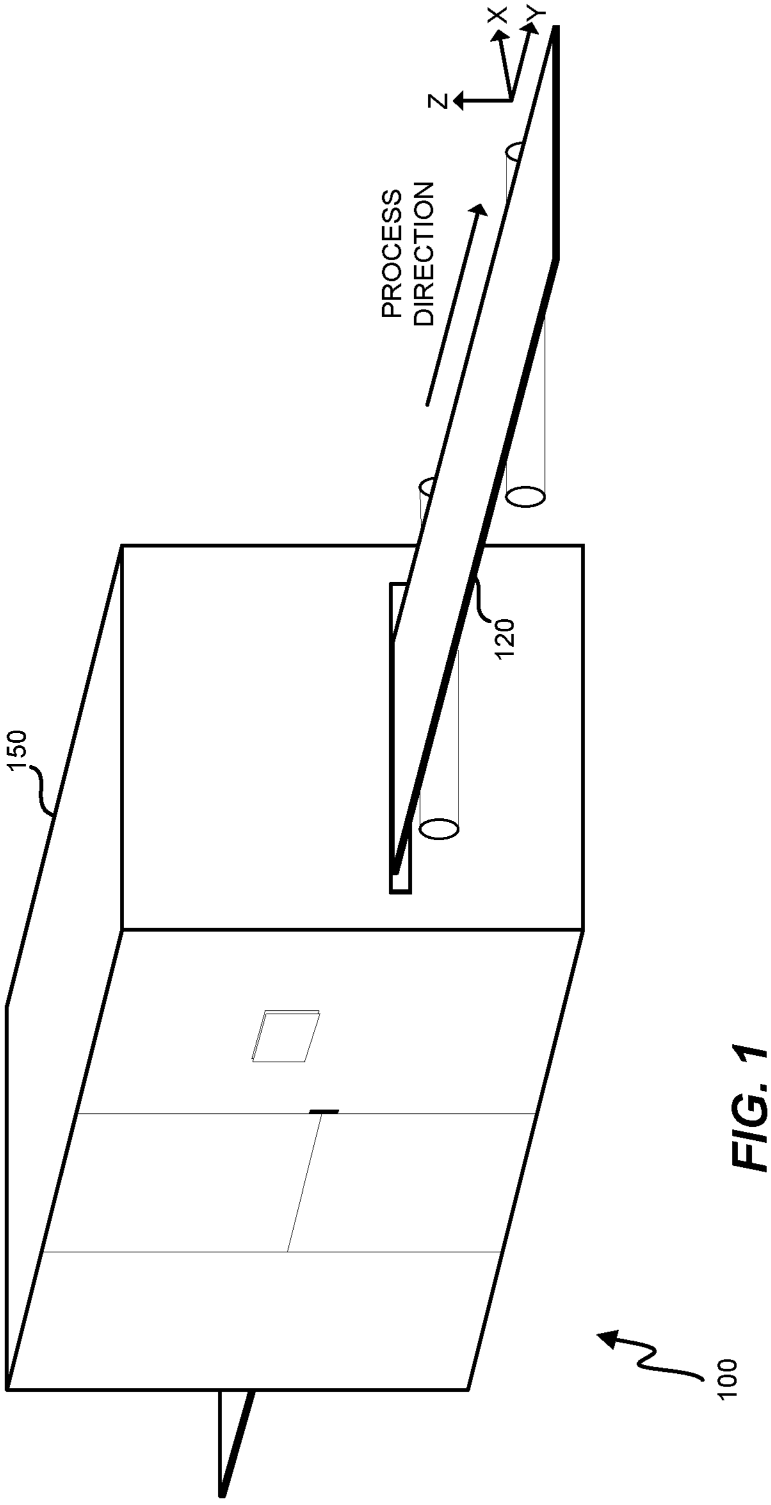
FIG. 1 illustrates a printing system in an illustrative embodiment.

FIG. 1 illustrates a printing system 100 in an illustrative embodiment. The printing system 100 includes a printer 150 that applies marks to a print medium 120. The applied marking material may comprise ink in the form of any suitable fluid for marking the print medium 120. Suitable fluids may comprise aqueous inks, oil-based paints, additive manufacturing materials, etc. As shown in this example, the printer 150 may comprise a continuous-forms inkjet printer that prints on a web of continuous-form media, such as paper. However, embodiments described herein also apply to alternative print systems such as cut-sheet printers, wide format printers, etc. FIG. 1 illustrates a process direction (Y) in which the print medium 120 travels during printing, a cross-process direction (X) that is lateral and perpendicular to the process direction, and a vertical direction Z.

Figure 2:
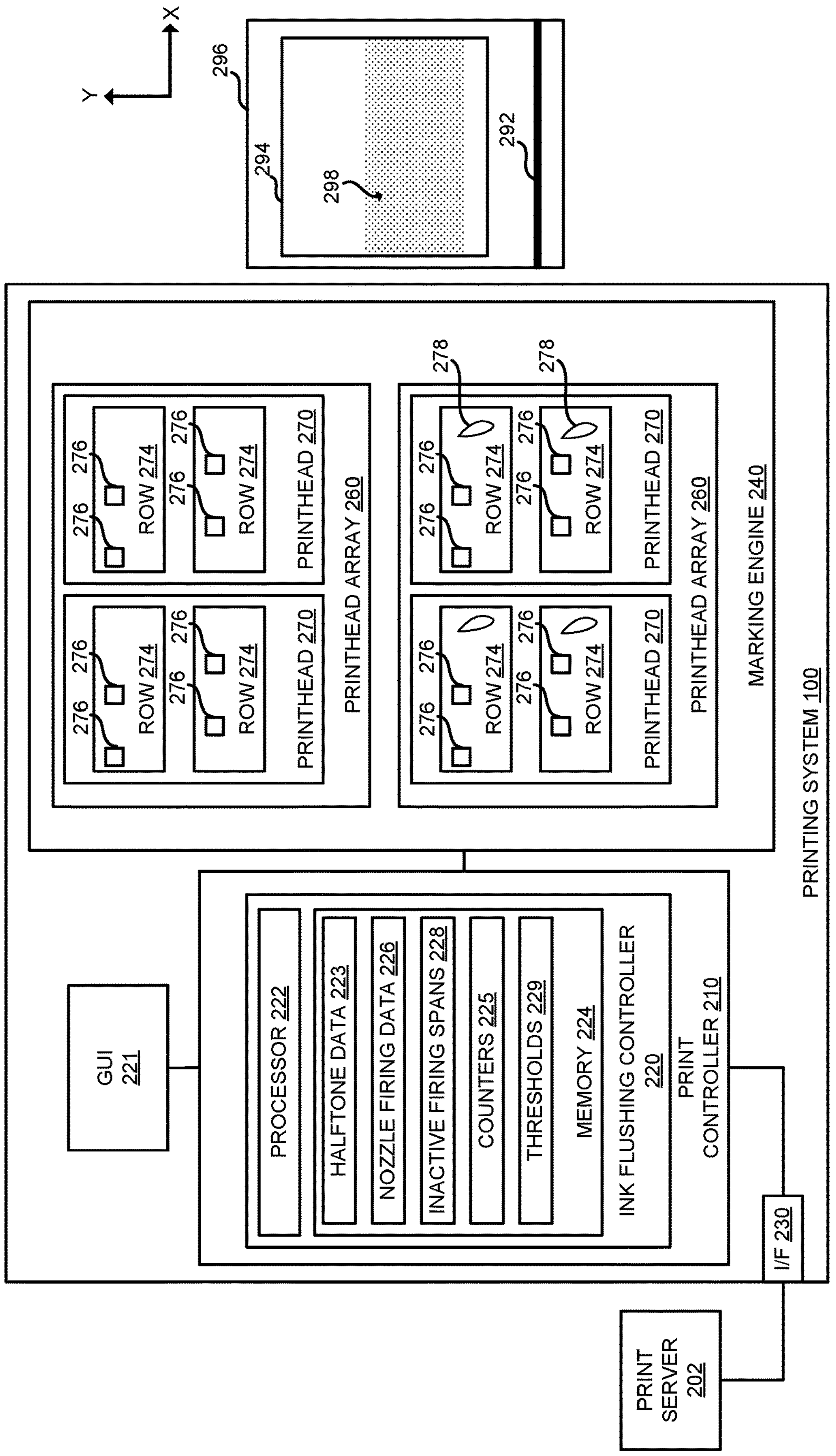
FIG. 2 is a block diagram of the printing system of FIG. 1 in an illustrative embodiment.

FIG. 2 is a block diagram of the printing system 100 of FIG. 1 in an illustrative embodiment. The printing system 100 includes an interface (UF) 230 for receiving print data and communicating with a print server 202, a print controller 210 for processing the print data, a marking engine 240 for printing onto the print medium 120 in accordance with the print data, and a Graphical User Interface (GUI) 221 for processing user instructions and providing summaries of print progress.

During operation of the printing system 100, OF 230 receives print data for one or more print jobs (e.g., from a print server 202), and passes the print data to print controller 210. OF 230 may receive the print data in the form of rasterized print data or Page Description Language (PDL) print data for storage in memory 224. OF 230 may be implemented as an Ethernet interface, a wireless network interface, etc.

The print controller 210 processes the print data to prepare print jobs for printing, such as by rasterizing the print data and/or preparing halftone data based on the print data. For example, the print controller 210 may obtain/convert print data in formats such as an Intelligent Printer Data Stream (IPDS), PostScript, or Printer Command Language (PCL) into bitmaps for printing to the print medium 120 with printhead(s) 270. For example, the print controller 210 may utilize one or more Rasterization Image Processors (RIPs) to translate the print data into halftone bitmaps. A halftone bitmap is a two-dimensional array of pixels representing a pattern of ink drops to be applied to the print medium 120 to form an image (or page) of a print job. A mapping of halftone bitmap pixels to individual nozzles of the printheads may be determined during setup of a printing system 100, based on model information for the printing system 100, or based on input from a print shop operator as desired, and may be stored in memory 224 for later reference.

With a set of halftone bitmaps, the print controller 210 may determine the target location on print medium 120 and type of every ink droplet to be printed for each color plane, and may direct printhead(s) 270 accordingly. The print controller 210 may further perform various image processing tasks for printing operations, such as color management, color separation, color linearization, interpreting, rendering, rasterizing, halftoning, or otherwise converting raw sheet images of a print job into sheetside bitmaps. The print controller 210 may be implemented, for example, as custom circuitry, as a special or general-purpose processor executing programmed instructions stored in an associated program memory, or some combination thereof.

Ink flushing controller 220 modifies print data and/or halftone data to add firing instructions (i.e., instructions indicating a size of ink droplet to eject, as well as when/where to eject the ink droplet) for ejecting ink from nozzles 276 of the marking engine. This causes the printing system 100 to periodically output flush marks onto a page 296, in a process known as flushing. Flushing is beneficial because it prevents idle nozzles from becoming clogged during periods of inactivity. Flushing may also be referred to as purging, cleaning, or spitting.

The flush marks output by the printing system 100 may comprise a flush line 292 and/or a flush pattern 298. A flush line 292 is often printed on the page 296 as a solid region of ink at page boundaries (e.g., top or bottom page margin) outside of a printed image 294 on the page 296. The flush line 292 may be cut from the page 296 in post-print handling. By contrast, the flush pattern 298 is typically printed on the page 296 as small dots, or "stars," scattered through the page 296 and comingled with the printed image 294. Flush patterns may also be referred to as "star flushing," "star patterns," or "star flushing patterns."

The ink flushing controller 220 of FIG. 2 has been enhanced to generate firing instructions that cause overlap nozzles located within overlap regions for printheads 270 to eject droplets of ink. Overlap regions comprise regions wherein nozzles at adjacent printheads of a marking engine overlap along a widthwise direction. Overlap nozzles comprise nozzles 276 which are located within an overlap region, but are not used for printing print data. For example, an overlap nozzle may lack instructions to eject ink during the entirety of a print job. Overlap nozzles occur when multiple nozzles 276, ejecting the same color of ink, occupy the same widthwise position with respect to the print medium 120 and would hence print the same print data. Defining one of the nozzles 276 as an overlap nozzle prevents "double printing" from both nozzles 276 that would result in detectable banding and overapplication of ink. Thus, defining overlap nozzles helps to both reduce ink usage and enhance print quality, which is generally beneficial. However, the fact that overlap nozzles are left idle during printing may cause overlap nozzles to become prone to clogging.

Ink flushing controller 220 beneficially overcomes this issue, by operating processor 222 to review nozzle firing data 226 in memory 224. Firing data 226 may be indicated in halftone data 223 or firing instructions for a print job. Firing data 226 comprises data that indicates each of the ink droplet ejection firing events for each of the nozzles. Further, firing data 226 events include a frame a reference (i.e., an amount of distance along the process direction, a period of time, or a number lines). Ink flushing controller 220 uses counters 225 to determine inactive firing spans 228 for overlap nozzles. If the counters 225 exceed defined thresholds 229, then the ink flushing controller 220 may alter halftone data to insert firing instructions for the overlap nozzles. This causes the overlap nozzles to periodically eject ink, which provides a technical benefit by ensuring that the overlap nozzles do not clog over time. Thus, overlap nozzles remain available to eject droplets of ink and avoid the need for constant cleaning.

The flushing of overlap nozzles results in increased complexity, because it means that twice as many nozzles 276 per amount of widthwise distance are being flushed in overlap regions than in non-overlap regions. Hence, it may be desirable to flush overlap nozzles in a manner than masks this issue. In one embodiment, the ink flushing controller 220 intelligently masks the flushing of overlap nozzles, by causing the overlap nozzles to flush onto ink already output by corresponding primary nozzles.

To perform functions, the ink flushing controller 220 (and/or the print controller 210) may be implemented by a processor 222 communicatively coupled to a memory 224. The processor 222 includes any electronic circuits and/or optical circuits that are able to perform functions. For example, the processor 222 may include one or more Central Processing Units (CPUs), Graphics Processing Units (GPUs), microprocessors, Digital Signal Processors (DSPs), Application-specific Integrated Circuits (ASICs), Programmable Logic Devices (PLDs), control circuitry, etc. Some examples of processors include INTEL® CORE™ processors, Advanced Reduced Instruction Set Computing (RISC) Machines (ARM®) processors, etc.

The memory 224 includes any electronic circuits, optical circuits, and/or magnetic circuits that are able to store data. For instance, the memory 224 may include one or more volatile or non-volatile Dynamic Random Access Memory (DRAM) devices, FLASH devices, volatile or nonvolatile Static RAM (SRAM) devices, magnetic disk drives, Solid State Disks (SSDs), etc. Some examples of non-volatile DRAM and SRAM include battery-backed DRAM and battery-backed SRAM. Furthermore, while the ink flushing controller 220 is illustrated as integrated into print controller 210 in FIG. 2, in further embodiments the ink flushing controller 220 may be integrated into the marking engine 240, and/or implemented as an independent element.

The marking engine 240 marks the print medium 120, such as page 296, with ink to generate physical output for received print jobs. In this embodiment, the marking engine 240 comprises multiple printhead arrays 260. For example, the marking engine 240 may include a printhead array 260 for each of multiple color planes. Each printhead array 260 comprises multiple printheads 270. The printheads 270 may partially overlap along the widthwise direction, such as the X direction, to ensure that there are no visible widthwise gaps in applied ink. Each printhead 270 includes one or more rows 274 of nozzles 276, which eject droplets 278 of ink onto a print medium 120, such as a web or a page 296. Each nozzle 276 is configured to discharge/eject drops of ink onto the print medium 120. Additionally, each nozzle 276 may eject a plurality of drop sizes (e.g., none, small, medium and large). The printheads 270 may be fixed such that each nozzle 276 consistently marks a specific, predefined location along the X direction (i.e., cross-process direction). Alternatively, the printheads 270 may be operable to move along the X direction. During printing, the print medium 120 passes underneath the printhead arrays 260 while the nozzles 276 discharge ink to form pixels on the print medium 120.

GUI 221 provides graphical information reporting the progress of printing for print jobs at the printing system, and is capable of receiving instructions from a user to display different reports, halt printing, or adjust printing parameters. The GUI 221 may be implemented as a touchscreen, or a display screen configured for receiving input from a mouse, keyboard, microphone, etc.

The particular arrangement, number, and configuration of components described herein are non-limiting examples. Illustrative details of the operation of the ink flushing controller 220 will be discussed with regard to FIG. 3.

Figure 3:
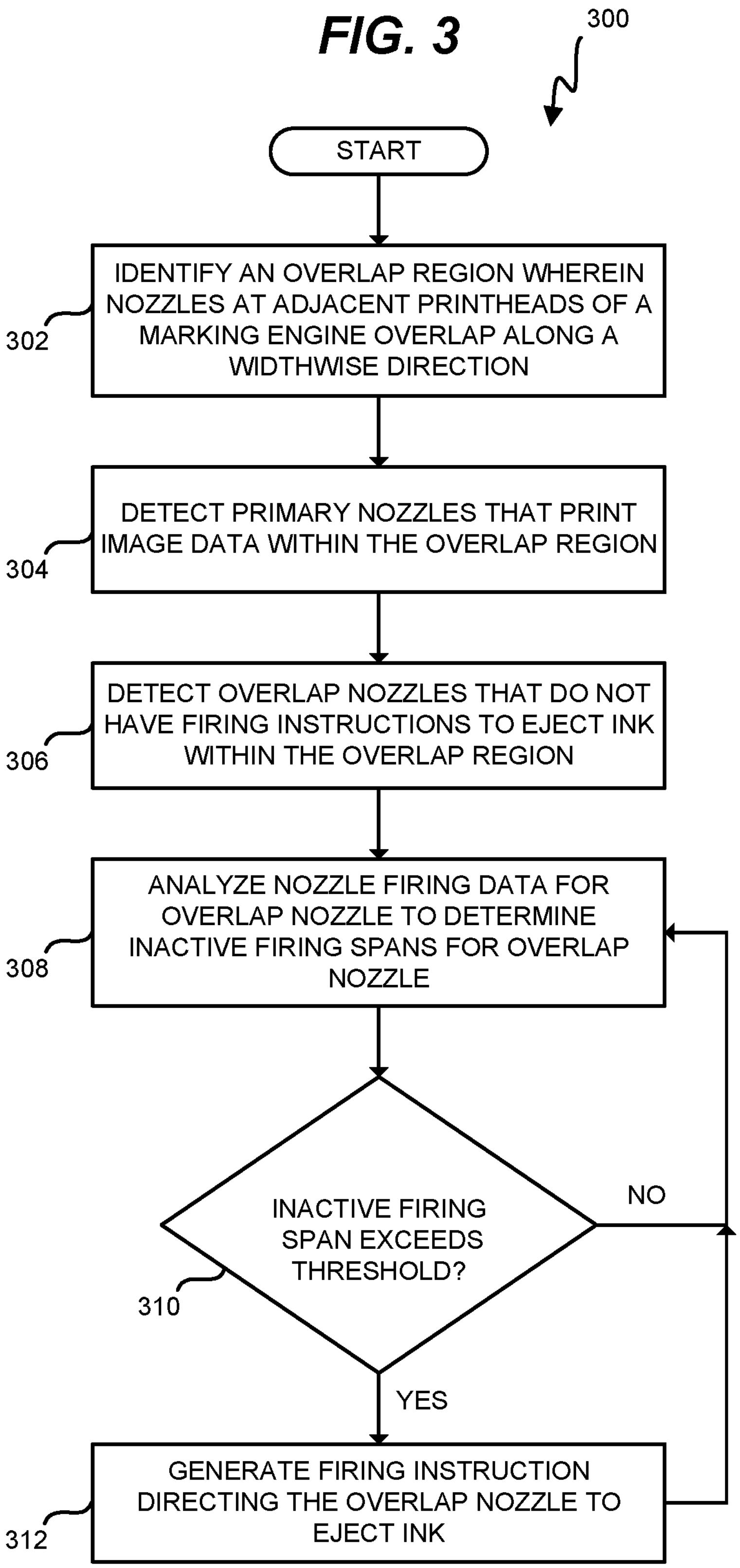
FIG. 3 is a flowchart illustrating a method of flushing ink in an illustrative embodiment.

FIG. 3 is a flowchart illustrating a method 300 of flushing ink in an illustrative embodiment. The steps of the method 300 are described with reference to the printing system 100 of FIGS. 1 and 2, but those skilled in the art will appreciate that the method 300 may be performed in other systems. The steps of the flowcharts described herein are not all inclusive and may include other steps not shown. The steps described herein may also be performed in an alternative order.

In step 302, ink flushing controller 220 identifies an overlap region wherein nozzles 276 at adjacent printheads 270 of a marking engine 240 overlap along a widthwise direction (i.e., the X direction). Overlap regions may be determined during setup of a printing system 100, based on model information for the printing system 100, or based on input from a print shop operator as desired, and may be stored in memory 224 for later reference.

In step 304, ink flushing controller 220 detects primary nozzles that print image data within the overlap region. As used herein, a "primary nozzle" comprises a nozzle that ejects ink according to print data received for print jobs, while an "overlap nozzle" comprises a nozzle in the same widthwise position as a primary nozzle, in the same color plane as the primary nozzle, that does not eject ink according to print data received for print jobs. That is, an overlap nozzle remains idle during printing, and does not utilize print data provided with the print job. Defining overlap nozzles and primary nozzles remains important, because without these definitions, both nozzles at the same widthwise position for the same color plane, would fire, resulting in excess application of ink and visible banding.

In many embodiments, for each overlap region, a primary nozzle and overlap nozzle will be defined for each of multiple color planes. For example, in an overlap region, there may be four primary nozzles, one for each of C, M, Y, and K. Similarly, there may be four overlap nozzles, one for each of C, M, Y, and K. Primary nozzles and overlap nozzles are rarely if ever defined in print data received for a print job. Rather, settings at the printing system 100 are often used to define which nozzles 276 are primary nozzles and which nozzles 276 are overlap nozzles.

Detection of primary nozzles may be performed by reviewing information in memory 224 defining the overlap region. For example, information stored in memory 224 may also define primary nozzles and overlap nozzles for each overlap region. In a further embodiment, primary nozzles may be determined based on an algorithm or heuristic. For example, memory 224 may store instructions defining nozzles 276 as overlap nozzles or primary nozzles based on their distance from a center of a printhead, based on a pattern or sequence, or based on direct input provided by a print shop operator. In a further example, in an overlap region one printhead may have all primary nozzles while another printhead may have all overlap nozzles, or the primary nozzles and overlap nozzles may alternate column by column between the two printheads In step 306, ink flushing controller 220 detects overlap nozzles that do not have firing instructions to eject ink within the overlap region. This step may use similar techniques to those described in step 304 for detecting primary nozzles.

In step 308, ink flushing controller 220 analyzes nozzle firing data 226 for each overlap nozzle to determine inactive firing spans 228 for each overlap nozzle. An inactive firing span 228 comprises an amount of distance along the process direction, a period of time, or a number lines of print data, such as halftone data, during which a specific nozzle does not eject ink. Nozzle firing data 226 may be reviewed, for example, in the form of halftone data, either before or after star pattern or other flushing data has been added to the halftone data. For example, for each X coordinate in halftone data, an inactive firing span may be determined for each nozzle in a color plane. Halftone data translates a bitmap of color data into a series of discrete ink droplets of specific sizes at the locations of specific nozzles. For example, each pixel on a halftone bitmap may correspond with a 2-bit value indicating one of four possible firing signals or drop sizes for a nozzle to eject—none, small, medium, or large.

In some embodiments, the ink flushing controller 220 is configured to determine the inactive firing span of each nozzle by counting between firings of the nozzle according to the nozzle firing data 226. For example, the ink flushing controller 220 may implement a counter 225 that tracks the firing activity of a nozzle and advances in increments as the nozzle does not eject ink. A counter may be implemented as a timer, a register, etc. Time and/or distance may be determined based on an expected speed of the printing system 100 and/or print medium 120, as well as a number of lines of print data being reviewed. If a nozzle 276 has an inactive firing span 228 that is too long, then it may become clogged and unable to fire a droplet 278 of ink when indicated by the print data.

To resolve the issue of overlap nozzles clogging, ink flushing controller 220 determines whether or not an inactive firing span 228 for an overlap nozzle exceeds a threshold 229 in step 310. The threshold 229 may be the same for all nozzles 276, may vary between nozzles 276, may be uniquely defined for each nozzle 276, and may even change over time for a single nozzle 276. The threshold 229 may comprise, for example, a number of lines between five hundred and fifteen hundred. If the inactive firing span 228 for the overlap nozzle does not exceed the threshold 229, then processing returns to step 308 as additional portions of print data, such as additional lines of halftone data, are considered. Alternatively, if the inactive firing span 228 exceeds the threshold 229, then processing proceeds to step 312.

In step 312, in response to determining that an inactive firing span 228 for an overlap nozzle exceeds a threshold 229, ink flushing controller 220 generates a firing instruction directing the overlap nozzle to eject ink. This ensures that the overlap nozzle does not become clogged during printing. In further embodiments, the firing instruction is generated as part of a star flushing pattern integrated into halftone data for the color plane of the overlap nozzle.

Method 300 provides a technical benefit over prior techniques, because it intelligently flushes overlap nozzles during printing, in a manner which masks the presence of that flushing. This ensures that the overlap nozzles do not become clogged during printing, reducing the need for otherwise unnecessary printhead cleaning operations which may occupy a substantial amount of time. Furthermore, the techniques of method 300 may be beneficially utilized in systems that perform star flushing, or systems that perform hybrid flushing that utilizes both star flushing and flush lines.

In a further embodiment, the ink flushing controller 220 is configured to analyze the nozzle firing data 226 to determine that more than a predetermined number of consecutive lines do not include instructions to fire ink, and to increase an amount of flushing onto the consecutive lines by nozzles outside of the overlap region (i.e., nozzles that do not occupy the widthwise positions of the overlap region). This accounts for the fact that twice as many nozzles per unit of width flush within an overlap region than within other portions of the page 296. Hence, on blank space, overlap regions may be noticeably darker than non-overlap regions, resulting in banding. Increasing flushing for non-overlap regions in such white spaces helps to account for this issue, by making the amount of flushing in non-overlap regions similar to that of overlap regions. This eliminates the presence of noticeable banding on the page 296.

Figure 4:
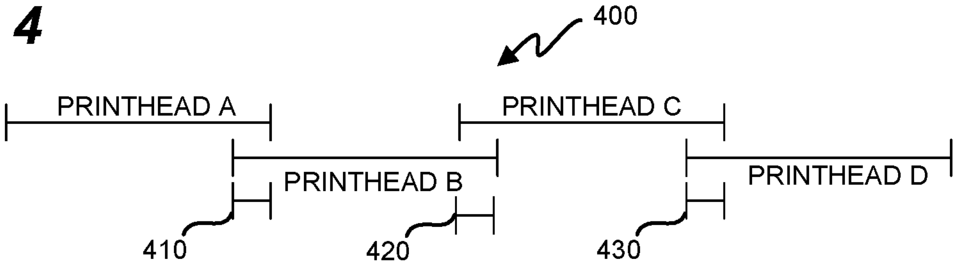
FIG. 4 depicts overlap regions between printheads in an illustrative embodiment.

FIG. 4 is a diagram 400 that depicts overlap regions between printheads in an illustrative embodiment. In this embodiment, four printheads (printhead A, printhead B, printhead C, and printhead D) are depicted. These four printheads may be utilized together to apply ink for a single color plane for printing system 100, such as Cyan (C), Magenta (M), Yellow (Y), or Key black (K). The printheads are arranged in a staggered configuration, resulting in overlap region 410 between printhead A and printhead B, overlap region 420 between printhead B and printhead C, and overlap region 430 between printhead C and printhead D.

Figure 5:
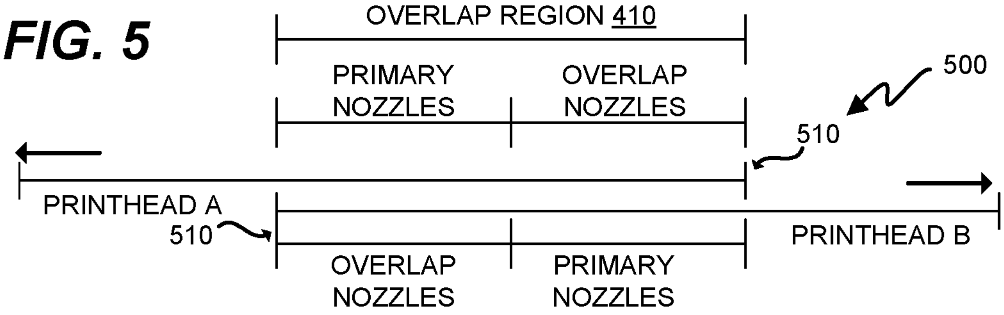
FIG. 5 depicts an overlap region between printheads in an illustrative embodiment.

FIG. 5 is a diagram 500 that depicts an overlap region 410 between printheads in an illustrative embodiment. In this embodiment, nozzles within printhead A and printhead B are each categorized as either a primary nozzle or an overlap nozzle. A primary nozzle performs printing for a print job, while an overlap nozzle remains idle during printing, or lacks firing instructions for the print job. In this embodiment, nozzles in the overlap region 410 for a color plane are categorized such that there is at least one primary nozzle for each widthwise position along the overlap region, and there are not multiple primary nozzles at any widthwise position along the overlap region. For example, nozzles closest to the edges 510 of their respective printheads may be classified as overlap nozzles, while other nozzles may be classified as primary nozzles. However, this is just one of countless techniques by which nozzles may be classified as overlap nozzles, and any convention desired may be utilized.

Figure 6:
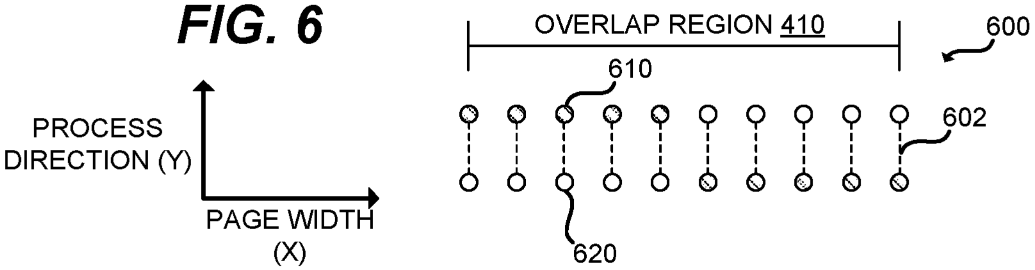
FIG. 6 depicts individual nozzles within an overlap region between printheads in an illustrative embodiment.

FIG. 6 is a diagram 600 that depicts individual nozzles within an overlap region between printheads in an illustrative embodiment. In this embodiment, nozzles that occupy the same widthwise position are connected via a dashed line 602. Nozzles 610 which are shaded are classified as primary nozzles, and will eject ink according to received print data for their widthwise position. Meanwhile, nozzles 620 which are not shaded comprise overlap nozzles. Overlap nozzles will not eject ink according to the received print data for their widthwise position.

Figure 7:
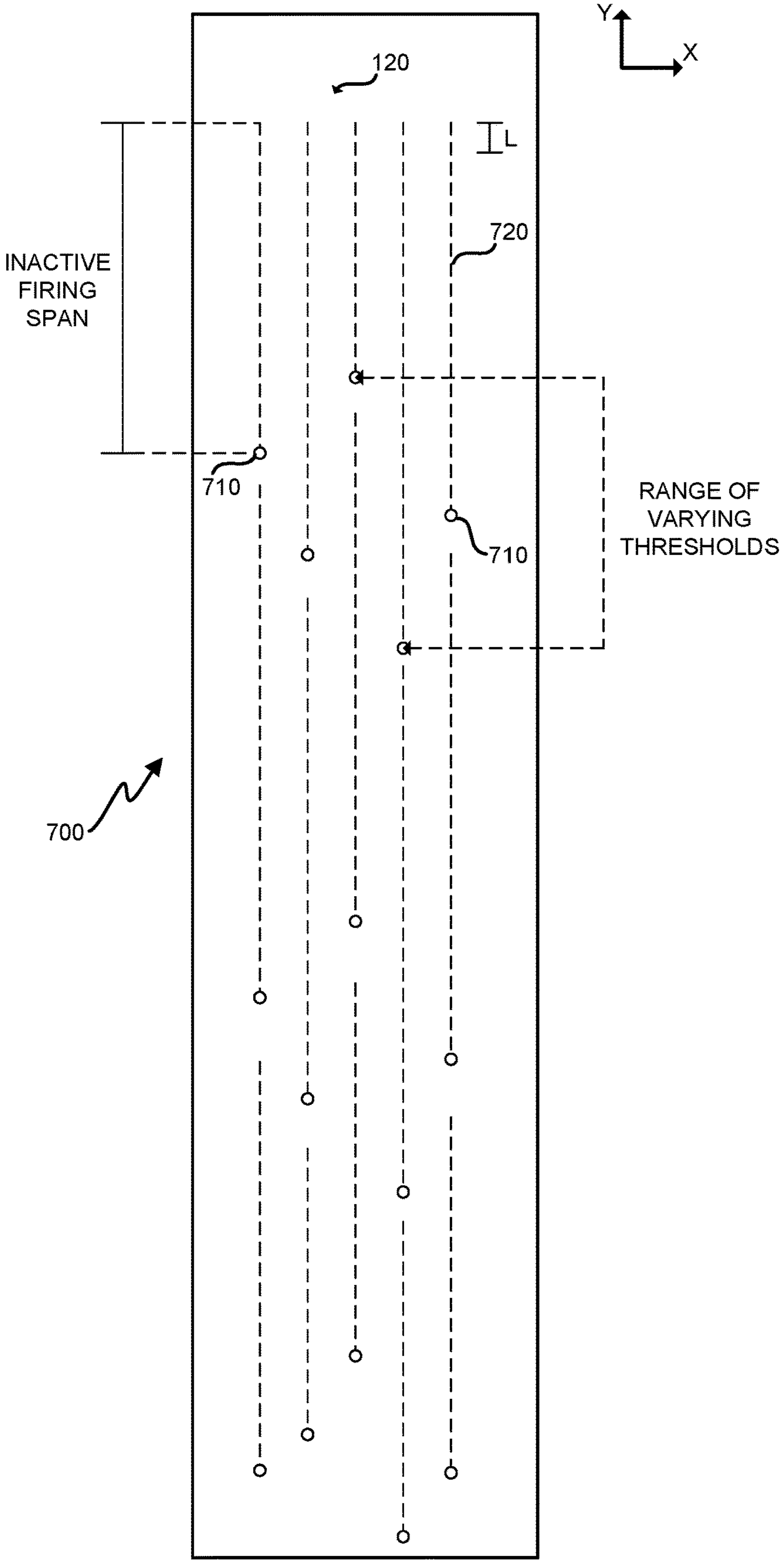
FIG. 7 is a diagram depicting output from nozzles having differing thresholds for inactive firing spans in an illustrative embodiment.

FIG. 7 is a diagram 700 depicting output from nozzles having differing thresholds for inactive firing spans in an illustrative embodiment. In this embodiment, each nozzle has a distinct threshold 720 for an inactive firing span, after which the nozzle ejects a droplet of ink, resulting in a mark 710 on a print medium 120. The threshold 720 may comprise a time period, length in the process direction (Y), number of lines (L) of halftone data, etc. Furthermore, the threshold 720 for inactive firing span varies between nozzles, ensuring that the nozzles do not leave a horizontal line or other noticeable pattern upon flushing.

In further embodiments, the threshold for each nozzle is adjusted after each time it flushes, allowing for further variation that prevents the marks from forming a pattern easily detected by a reader. For example, a threshold may be stochastically determined for each overlap nozzle within a predefined range (e.g., between five hundred and fifteen hundred lines), such as according to a uniform or gaussian distribution.

In one embodiment, a vector of random values is generated. The vector has a length equal to a value larger than a width of the image being printed, and is mutually prime to the width. For example, the vector may be given a width consisting of a large prime number greater than the width (in pixels) of the image being printed, greater than ten times a resolution of the printer in Dots Per Inch (DPI), etc. Values in the vector may be mutually prime, such that the vector serves as a generator for all potential values within the predefined range. The vector may thus be used to assign unique thresholds to each overlap nozzle. A threshold may be adjusted for each overlap nozzle after a firing instruction is generated for that overlap nozzle. This results in a technical benefit by making flushing for each nozzle at each widthwise position appear to be more random, which means that a pattern of flushing is harder to detect. It provides a further technical benefit of computational flexibility.

Figure 8:
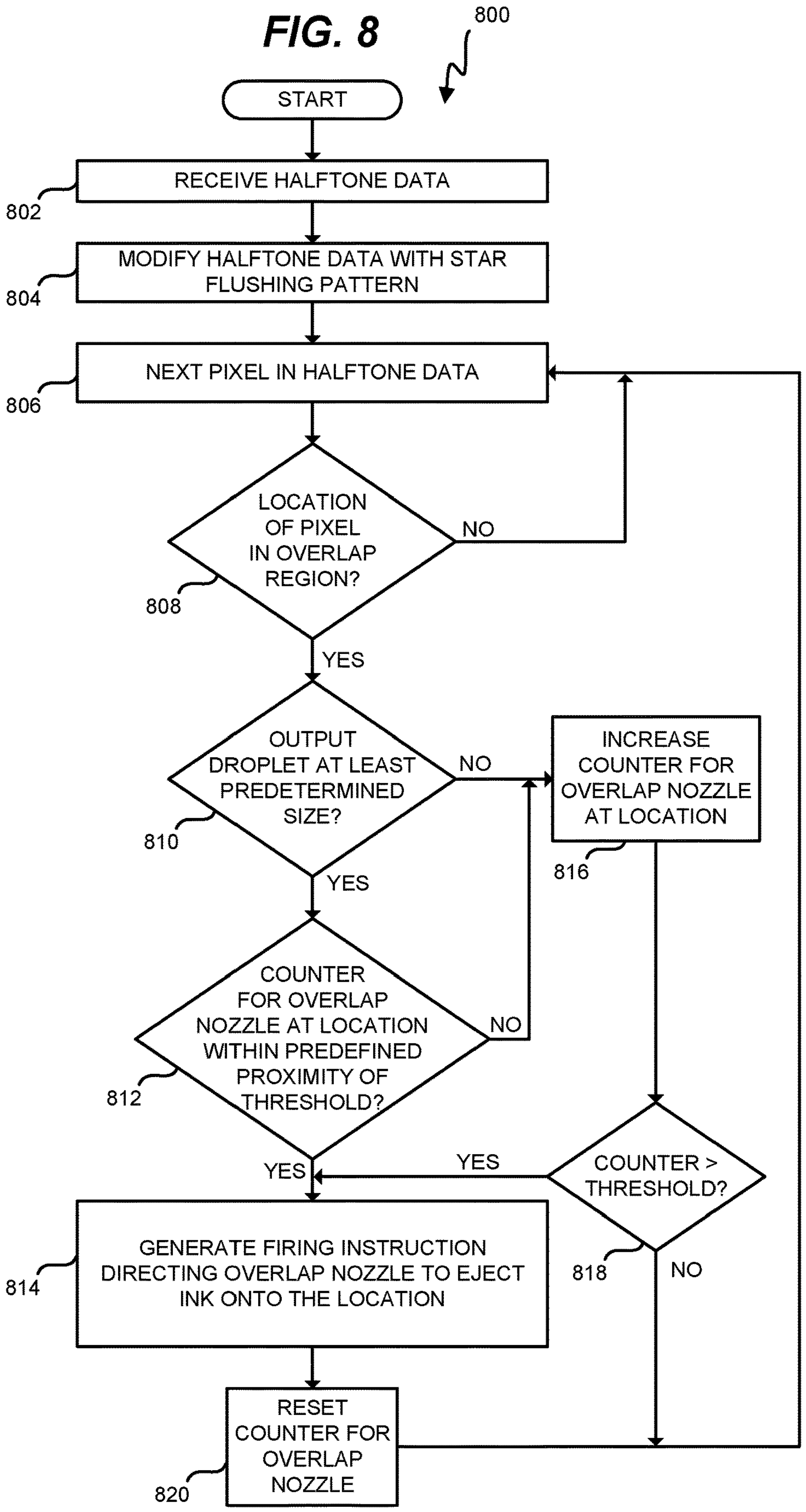
FIG. 8 is a flowchart illustrating a method of processing halftone data to generate firing instructions for overlap nozzles in an illustrative embodiment.

FIG. 8 is a flowchart illustrating a method 800 of processing halftone data to generate firing instructions for overlap nozzles in an illustrative embodiment. In one embodiment, method 800 is performed once for halftone data for each color plane, in order to intelligently flush overlap nozzles within each color plane.

Step 802 includes ink flushing controller 220 receiving halftone data. The halftone data may comprise multiple bitmaps, one per color plane, wherein the number of widthwise pixels in each bitmap corresponds with the number of nozzles used for printing print data in the color plane. The halftone data may be processed from rasterized data received via OF 230 from a print server 202, or may be generated by print controller 210 as desired. In another embodiment, firing instructions may be received and processed in place of halftone data in this process 800.

Step 804 includes ink flushing controller 220 modifying the halftone data with a star flushing pattern. That is, the ink flushing controller 220 adds star flushing patterns to each bitmap of the halftone data, for each color plane, in order to ensure that no nozzles which eject ink according to print data for the print job will become clogged. That is, the star flushing patterns will provide flushing for primary nozzles, but not overlap nozzles. The following steps describe how to intelligently integrate flushing for overlap nozzles into star flushing patterns.

Step 806 includes ink flushing controller 220 identifying a next pixel in the halftone data. This may be performed iteratively across all widthwise pixels in a first row, followed by all widthwise pixels of a next row, and so on, for each of the halftone bitmaps.

Step 808 comprises determining a location of the pixel. The location may comprise a widthwise position, column, or corresponding nozzle. If the pixel is in an overlap region, processing proceeds to step 810. Otherwise, processing returns to step 806, wherein a next pixel of the halftone data is reviewed.

If the pixel is in an overlap region, then it may be desirable to flush the overlap nozzle, at the widthwise location of the pixel, that is not ejecting ink according to received print data. To this end, step 810 comprises determining whether an output droplet size for the pixel is at least a predetermined size. Halftone data numerically indicates droplet size. The droplet fired for the pixel will be fired by the primary nozzle in the same widthwise position as the overlap nozzle. If the droplet size is greater than the predetermined size (e.g., "medium," corresponding to the number two), then the droplet fired by the primary nozzle may be capable of hiding or obscuring a droplet flushed by an overlap nozzle.

Alternatively, if the droplet is not of the predetermined size, then the droplet is not sufficiently large to obscure flushed droplets. Thus, no flushing will occur unless necessary, and a counter for the overlap nozzle corresponding to the location and/or color plane is increased in step 816. Alternatively, if the droplet size in the halftone data is at least the predetermined size, then ink flushing controller proceeds to step 812.

In step 812, ink flushing controller 220 determines whether a counter for an overlap nozzle at the location and/or color plane is within a predefined proximity of its threshold. The predefined proximity may comprise a time period, number or lines, or linear distance in the process direction. For example, the predefined proximity may comprise five percent or ten percent of the threshold, may comprise fifty or one hundred lines of halftone data, etc. If the counter is within the predefined proximity of the threshold, it is appropriate to perform intelligent flushing of ink from the overlap nozzle onto ink applied by a corresponding primary nozzle. Thus, processing continues to step 814. Otherwise, processing proceeds to step 816.

In step 814, ink flushing controller 220 generates a firing instruction directing the overlap nozzle to eject ink onto the location. Processing then continues to step 820, wherein the counter for the overlap nozzle at the location and/or color plane is reset, and the ink flushing controller returns to step 806 to review a next pixel in the halftone data.

In step 816, it is not appropriate to perform flushing of ink from the overlap nozzle onto ink applied by a corresponding primary nozzle, unless the counter has been reached. Thus, the counter for the overlap nozzle at the location and/or color plane is increased by ink flushing controller 220. For example, the counter may be increased by a line, a distance along the process direction, or a period of time based on a speed at which the print medium 120 will move along the process direction. Processing then proceeds to step 818, where ink flushing controller 220 determines whether the counter is greater than the threshold. If so, processing proceeds to step 814. Otherwise, processing returns to step 806.

By utilizing method 800, the ink flushing controller is configured, in response to determining that a primary nozzle is instructed to fire a droplet of at least a predetermined size within a predefined proximity of the threshold of a corresponding overlap nozzle, to generate a firing instruction for the corresponding overlap nozzle directing the overlap nozzle to eject ink onto a location targeted by the droplet fired by the primary nozzle. Method 800 provides a technical benefit by intelligently flushing overlap nozzles onto locations where sufficiently large droplets have already been flushed onto the page. However, the flushing is only performed when an overlap nozzle is already close to its threshold value. This helps to mask the presence of detectable patterns in flushing performed for overlap nozzles.

In a further embodiment, overlap nozzles that occupy the same widthwise position as a primary nozzle in the Key black color plane (i.e., a comparatively higher optical density ink) may use method 800 to intelligently flush ink onto marks applied by that primary nozzle, even if the overlap nozzles are in another color plane. The associated technical benefit is that the ink droplet from the primary nozzle ink obscures the ink droplet from the overlap nozzle resulting in better appearance of the printed output to the human eye. Thus, in some embodiments the primary nozzle occupies a different color plane than the corresponding overlap nozzle.

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is provided in the form of a printing system that includes an ink flushing controller. The ink flushing controller is able to identify an overlap region wherein nozzles at adjacent printheads of a marking engine overlap along a widthwise direction, to detect primary nozzles that print image data within the overlap region, and to detect overlap nozzles that do not have firing instructions to eject ink within the overlap region. The ink flushing controller is further able to analyze nozzle firing data for each overlap nozzle to determine inactive firing spans for each overlap nozzle, and in response to determining that an inactive firing span for an overlap nozzle exceeds a threshold, to generate a firing instruction directing the overlap nozzle to eject ink.

A second clause is provided in the form of the printing system of the first clause, wherein the ink flushing controller is further configured, in response to determining that a primary nozzle is instructed to fire a droplet of at least a predetermined size within a predefined proximity of the threshold of a corresponding overlap nozzle, to generate a firing instruction for the corresponding overlap nozzle directing the overlap nozzle to eject ink onto a location targeted by the droplet fired by the primary nozzle.

A third clause is provided in the form of the printing system of the second clause, wherein the primary nozzle occupies a different color plane than the corresponding overlap nozzle.

A fourth clause is provided in the form of the printing system of the first clause, wherein the threshold is stochastically determined for each overlap nozzle.

A fifth clause is provided in the form of the printing system of the first clause, wherein the threshold is adjusted for each overlap nozzle after a firing instruction is generated for that overlap nozzle.

A sixth clause is provided in the form of the printing system of the first clause, wherein the ink flushing controller is configured to generate each firing instruction as part of a star flushing pattern integrated into halftone data.

A seventh clause is provided in the form of the printing system of the first clause, wherein the ink flushing controller is configured to analyze the nozzle firing data to determine that more than a predetermined number of consecutive lines do not include instructions to fire ink, and to increase an amount of flushing onto the consecutive lines by nozzles outside of the overlap region.

An eighth clause is provided in the form of the printing system of the first clause, further comprising the marking engine.

A ninth clause is provided in the form of a non-transitory computer readable medium embodying programmed instructions which, when executed by a processor, are operable for performing a method. The method includes identifying an overlap region wherein nozzles at adjacent printheads of a marking engine overlap along a widthwise direction, detecting primary nozzles that print image data within the overlap region, detecting overlap nozzles that do not have firing instructions to eject ink within the overlap region, analyzing nozzle firing data for each overlap nozzle to determine inactive firing spans for each overlap nozzle, and in response to determining that an inactive firing span for an overlap nozzle exceeds a threshold, generating a firing instruction directing the overlap nozzle to eject ink.

A tenth clause is provided in the form of a non-transitory computer readable medium of the ninth clause, wherein the method further comprises in response to determining that a primary nozzle is instructed to fire a droplet of at least a predetermined size within a predefined proximity of the threshold of a corresponding overlap nozzle: generating a firing instruction for the corresponding overlap nozzle directing the overlap nozzle to eject ink onto a location targeted by the droplet fired by the primary nozzle.

An eleventh clause is provided in the form of a non-transitory computer readable medium of the tenth clause, wherein the primary nozzle occupies a different color plane than the corresponding overlap nozzle.

A twelfth clause is provided in the form of a non-transitory computer readable medium of the ninth clause, wherein the threshold is stochastically determined for each overlap nozzle.

A thirteenth clause is provided in the form of a non-transitory computer readable medium of the ninth clause, wherein the threshold is adjusted for each overlap nozzle after a firing instruction is generated for that overlap nozzle.

A fourteenth clause is provided in the form of a non-transitory computer readable medium of the ninth clause, wherein the method further comprises generating each firing instruction as part of a star flushing pattern integrated into halftone data.

A fifteenth clause is provided in the form of a non-transitory computer readable medium of the ninth clause, wherein the method further comprises analyzing the nozzle firing data to determine that more than a predetermined number of consecutive lines do not include instructions to fire ink; and increasing an amount of flushing onto the consecutive lines by nozzles outside of the overlap region.

A sixteenth clause is provided in the form of a method that includes identifying an overlap region wherein nozzles at adjacent printheads of a marking engine overlap along a widthwise direction, detecting primary nozzles that print image data within the overlap region, detecting overlap nozzles that do not have firing instructions to eject ink within the overlap region, analyzing nozzle firing data for each overlap nozzle to determine inactive firing spans for each overlap nozzle, and in response to determining that an inactive firing span for an overlap nozzle exceeds a threshold, generating a firing instruction directing the overlap nozzle to eject ink.

A seventeenth clause is provided in the form of a method of the sixteenth clause, further comprising: in response to determining that a primary nozzle is instructed to fire a droplet of at least a predetermined size within a predefined proximity of the threshold of a corresponding overlap nozzle: generating a firing instruction for the corresponding overlap nozzle directing the overlap nozzle to eject ink onto a location targeted by the droplet fired by the primary nozzle.

An eighteenth clause is provided in the form of a method of the sixteenth clause, wherein the primary nozzle occupies a different color plane than the corresponding overlap nozzle.

A nineteenth clause is provided in the form of a method of the sixteenth clause, wherein the threshold is stochastically determined for each overlap nozzle.

A twentieth clause is provided in the form of a method of the sixteenth clause, wherein the threshold is adjusted for each overlap nozzle after a firing instruction is generated for that overlap nozzle.

Embodiments disclosed herein can take the form of software, hardware, firmware, or various combinations thereof. In one embodiment, functions described herein are implemented in software, which includes but is not limited to firmware, resident software, microcode, etc.

Figure 9:
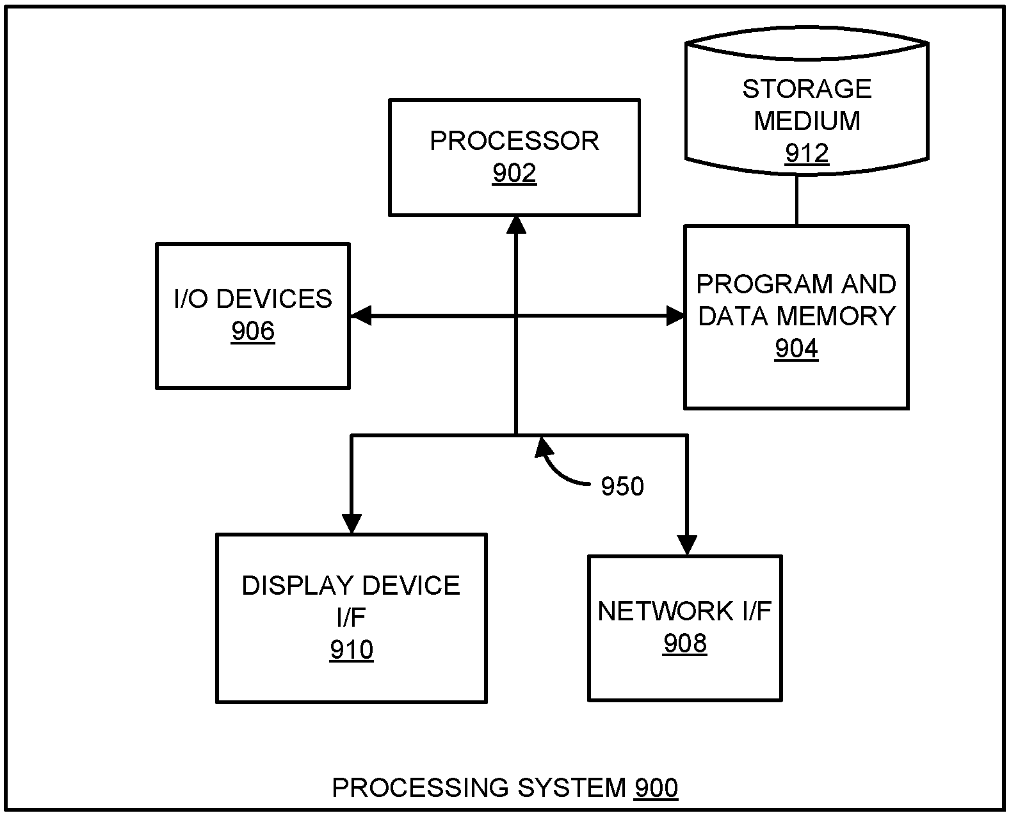
FIG. 9 illustrates a processing system operable to execute a computer readable medium embodying programmed instructions to perform desired functions in an illustrative embodiment.

FIG. 9 illustrates a processing system 900 operable to execute a computer readable medium embodying programmed instructions to perform desired functions in an illustrative embodiment. Processing system 900 is operable to perform the above operations by executing programmed instructions tangibly embodied on computer readable storage medium 912. In this regard, embodiments may take the form of a computer program accessible via computer-readable medium 912 providing program code for use by a computer or any other instruction execution system. For the purposes of this description, computer readable storage medium 912 can be anything that can contain or store the program for use by the computer such as an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope is not limited to those specific embodiments. Rather, the scope is defined by the following claims and any equivalents thereof.

What is claimed is:

1. A printing system comprising:

an ink flushing controller configured to identify an overlap region wherein nozzles at adjacent printheads of a marking engine overlap along a widthwise direction, to detect primary nozzles that print image data within the overlap region, and to detect overlap nozzles that do not have firing instructions to eject ink within the overlap region, the ink flushing controller is further configured to analyze nozzle firing data for each overlap nozzle to determine inactive firing spans for each overlap nozzle, and in response to determining that an inactive firing span for an overlap nozzle exceeds a threshold, to generate a firing instruction directing the overlap nozzle to eject ink.

2. The printing system of claim 1 wherein:

the ink flushing controller is further configured, in response to determining that a primary nozzle is instructed to fire a droplet of at least a predetermined size within a predefined proximity of the threshold of a corresponding overlap nozzle, to generate a firing instruction for the corresponding overlap nozzle directing the overlap nozzle to eject ink onto a location targeted by the droplet fired by the primary nozzle.

3. The printing system of claim 2 wherein:

the primary nozzle occupies a different color plane than the corresponding overlap nozzle.

4. The printing system of claim 1 wherein:

the threshold is stochastically determined for each overlap nozzle.

5. The printing system of claim 1 wherein:

the threshold is adjusted for each overlap nozzle after a firing instruction is generated for that overlap nozzle.

6. The printing system of claim 1 wherein:

the ink flushing controller is configured to generate each firing instruction as part of a star flushing pattern integrated into halftone data.

7. The printing system of claim 1 wherein:

the ink flushing controller is configured to analyze the nozzle firing data to determine that more than a predetermined number of consecutive lines do not include instructions to fire ink, and to increase an amount of flushing onto the consecutive lines by nozzles outside of the overlap region.

8. The printing system of claim 1 further comprising:

the marking engine.

9. A non-transitory computer readable medium embodying programmed instructions which, when executed by a processor, are operable for performing a method comprising:

identifying an overlap region wherein nozzles at adjacent printheads of a marking engine overlap along a widthwise direction;

detecting primary nozzles that print image data within the overlap region;

detecting overlap nozzles that do not have firing instructions to eject ink within the overlap region;

analyzing nozzle firing data for each overlap nozzle to determine inactive firing spans for each overlap nozzle; and in response to determining that an inactive firing span for an overlap nozzle exceeds a threshold, generating a firing instruction directing the overlap nozzle to eject ink.

10. The medium of claim 9 further comprising:

in response to determining that a primary nozzle is instructed to fire a droplet of at least a predetermined size within a predefined proximity of the threshold of a corresponding overlap nozzle:

generating a firing instruction for the corresponding overlap nozzle directing the overlap nozzle to eject ink onto a location targeted by the droplet fired by the primary nozzle.

11. The medium of claim 10 wherein:

the primary nozzle occupies a different color plane than the corresponding overlap nozzle.

12. The medium of claim 9 wherein:

the threshold is stochastically determined for each overlap nozzle.

13. The medium of claim 9 wherein:

the threshold is adjusted for each overlap nozzle after a firing instruction is generated for that overlap nozzle.

14. The medium of claim 9 further comprising:

generating each firing instruction as part of a star flushing pattern integrated into halftone data.

15. The medium of claim 9 further comprising:

analyzing the nozzle firing data to determine that more than a predetermined number of consecutive lines do not include instructions to fire ink; and increasing an amount of flushing onto the consecutive lines by nozzles outside of the overlap region.

16. A method comprising:

identifying an overlap region wherein nozzles at adjacent printheads of a marking engine overlap along a widthwise direction;

detecting primary nozzles that print image data within the overlap region;

detecting overlap nozzles that do not have firing instructions to eject ink within the overlap region;

analyzing nozzle firing data for each overlap nozzle to determine inactive firing spans for each overlap nozzle; and in response to determining that an inactive firing span for an overlap nozzle exceeds a threshold, generating a firing instruction directing the overlap nozzle to eject ink.

17. The method of claim 16 further comprising:

in response to determining that a primary nozzle is instructed to fire a droplet of at least a predetermined size within a predefined proximity of the threshold of a corresponding overlap nozzle:

generating a firing instruction for the corresponding overlap nozzle directing the overlap nozzle to eject ink onto a location targeted by the droplet fired by the primary nozzle.

18. The method of claim 17 wherein:

the primary nozzle occupies a different color plane than the corresponding overlap nozzle.

19. The method of claim 16 wherein:

the threshold is stochastically determined for each overlap nozzle.

20. The method of claim 16 wherein:

the threshold is adjusted for each overlap nozzle after a firing instruction is generated for that overlap nozzle.

* * * * *